United States Patent
Oishi et al.

(10) Patent No.: US 6,824,630 B2
(45) Date of Patent: Nov. 30, 2004

(54) FLEXIBLE FLAT CABLE CONNECTING METHOD AND A HORN CONSTRUCTION OF AN ULTRASONIC WELDING MACHINE

(75) Inventors: Akinori Oishi, Yokkaichi (JP); Takeshi Kihara, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 10/619,681

(22) Filed: Jul. 14, 2003

(65) Prior Publication Data

US 2004/0020580 A1 Feb. 5, 2004

(30) Foreign Application Priority Data

Jul. 31, 2002 (JP) ........................................ 2002-222733

(51) Int. Cl.[7] .............................................. B32B 31/16
(52) U.S. Cl. ........................................ 156/73.1; 156/580.2
(58) Field of Search ................................. 156/47, 51, 52, 156/73.1, 580.1, 580.2, 247; 228/1.1, 110.1

(56) References Cited

U.S. PATENT DOCUMENTS

| | | | | |
|---|---|---|---|---|
| 5,785,786 A | * | 7/1998 | Suzuki et al. | 156/73.1 |
| 6,089,438 A | * | 7/2000 | Suzuki et al. | 228/1.1 |
| 6,156,138 A | * | 12/2000 | Suzuki et al. | 156/55 |
| 6,562,166 B2 | * | 5/2003 | Molander et al. | 156/73.1 |
| 6,585,836 B2 | * | 7/2003 | Inagaki et al. | 156/55 |

FOREIGN PATENT DOCUMENTS

JP 2000-294332 10/2000

* cited by examiner

Primary Examiner—James Sells
(74) Attorney, Agent, or Firm—Gerald E. Hespos; Anthony J. Casella

(57) ABSTRACT

A flexible flat cable connecting method includes stripping an insulation coating (5) surface of a flexible flat cable (1) to be connected with a busbar (2) to expose a conductive element (4). The method continues by introducing the flexible flat cable (1) and the busbar (2) between a horn (7) and an anvil (6) of an ultrasonic welding machine (3), and then transmitting an ultrasonic vibration to the horn (7). The horn (7) has a plurality of elongated projections (9) of tapered cross-section pressed in contact with the insulation coating (5) of the flexible flat cable (1). Thus, the elongated projections (9) bite into the insulation coating (5) to weld the conductive element (4) ultrasonically into the busbar (2)

11 Claims, 8 Drawing Sheets

Breaking Strength (N)

Breaking Strength (N)

FLEXIBLE FLAT CABLE CONNECTING METHOD AND A HORN CONSTRUCTION OF AN ULTRASONIC WELDING MACHINE

BACKGROUND OF THE INVENTION

1. Field of the Invention

The invention relates to a method for connecting a flexible flat cable using an ultrasonic welding machine and to a horn of the ultrasonic welding machine.

2. Description of the Related Art

A flexible flat cable has a conductive element, such as a copper foil with a thickness of about 35 μm. The foil is covered by an insulation coating layer made, e.g. of a PET (polyethylene terephthalate). The flexible flat cable can be connected to a member, such as a busbar, by ultrasonic welding. More particularly, the conductive element is exposed by stripping the insulation coating layer over a specified range. The flexible flat cable and the member to be connected then are placed between an anvil and a horn of an ultrasonic welding machine so that the exposed surface of the conductive element contacts the upper surface of the member to be connected. An ultrasonic vibration is given to the horn while the flexible flat cable and the member to be connected are pressurized, thereby bringing metal atoms of the conductive element and the member to be connected into contact and connecting the two by an inter-atomic attraction.

The base material of the conductive element has a fairy low strength, and the strength of the base material tends to decrease due to damage caused by welding with the ultrasonic welding machine. Thus, it is difficult to ensure sufficient strength for a connecting portion of the conductive element of the flexible flat cable and the busbar or the like. There has been a problem that the conductive element of the flexible flat cable will break at the connecting portion, for example, due to a tensile force on the flexible flat cable.

Japanese Unexamined Patent Publication No. 2000-294332 discloses a process of connecting flexible wires to form conductive patterns while being held between a pair of insulation coating layers. One side of each insulation coating layer is removed to expose one surface of each wire. The stripped portions then are disposed between an anvil and a horn of an ultrasonic welding machine with the exposed surfaces of the wires put together and held in contact. An ultrasonic vibration is transmitted from the horn to conductive elements via the insulation films while the stripped portions are pressurized. Thus, ultrasonic welding is applied to the conductive element of one flexible wire and that of the other flexible wire to connect the two flexible wires while the outer surfaces of the conductive elements are covered by the insulation coating layers.

The above-described process connects the conductive portions while the outer surfaces of the connecting portion are covered by the insulating coating layers. The breaking strength of the connecting portion against an external load logically should be improved by the reinforcing action of the insulation coating. However, the ultrasonic welding is applied by transmitting the ultrasonic vibration to the horn while the horn is pressed in contact with the insulation coating that covers the outer surfaces of the conductive elements. Vibration energy applied during ultrasonic welding is absorbed by the insulation coating. As a result, proper ultra sonic welding of the conductive elements is difficult, and the conductive elements ultra sonically welded by this process have a low break strength.

FIGS. 11 and 12 show an ultrasonic welding machine 30 with a horn that has truncated pyramidal protrusions 32 that are intended to improve the breaking strength of ultra sonically welded parts. The protrusions 32 are formed at a specified interval on the bottom surface of the horn 31. The ultrasonic welding machine 30 also has an anvil 33. A flexible flat cable 1 and a member to be welded, such as a busbar 2, are introduced between the horn 31 and the anvil 33 of the ultrasonic welding machine 30. The protrusions 32 of the horn 31 bite into an insulation coating layer 5 that covers the outer surface of the flexible flat cable while the insulation coating layer 5 is molten by vibration energy transmitted to the horn 31. A conductive element 4 of the flexible flat cable is welded ultrasonically to the busbar 2 or the like with the leading end surfaces of the protrusions 32 pressed in contact with the conductive element 4 of the flexible flat cable 1.

Coating material that is molten during ultrasonic welding may clog the spacings between the protrusions 32, and may cause a connection failure. Thus, leading end surfaces of the protrusions 32 cannot be pressed into contact with the conductive element 4 when the coating material clogs the spaces between the protrusions 32. Thus, the vibration energy transmitted to the conductive element 4 decreases and proper ultrasonic welding cannot be performed.

In view of the above, it is an object of the invention to enable a flexible flat cable to be connected easily and properly to a member such as a busbar.

SUMMARY OF THE INVENTION

The invention relates to a flexible flat cable connecting method for welding a flexible flat cable. The flexible flat cable has a conductive element made of, e.g. a copper foil that is covered by an insulation coating layer. The connecting method employs an ultrasonic welding machine to connect the flexible flat cable with a member to be connected. The method comprises stripping the insulation coating layer from a connecting surface of the flexible flat cable to expose the conductive element. The method then includes introducing the flexible flat cable and the member to be connected between a horn and an anvil of the ultrasonic welding machine so that the connecting surface of the flexible flat cable is held in contact with the member to be connected. Elongated projections are provided on a press-contact surface of the horn. The projections have a tapered cross section and preferably are pressed in contact with the insulation coating layer of the flexible flat cable. The method then comprises transmitting an ultrasonic vibration to the horn. Thus, the elongated projections bite into the insulation coating layer to ultrasonically weld the conductive element to the member to be connected.

Accordingly, a connection strength between a flexible flat cable and a member to be connected such as a busbar is improved since a vibration energy can be transmitted efficiently to the conductive element while the leading ends of the elongated projections are pressed in contact with the conductive element. Moreover, the overall strength of the connection can be improved by the remaining insulation coating in the connection area.

The elongated projections on the press-contact surface of the horn preferably extend substantially in the longitudinal direction of the flexible flat cable.

Ultrasonically welding is repeated by causing the elongated projections of the horn to bite in the insulation coating layer of successive flexible flat cables. Coating material molten by the vibration energy during the first ultrasonic welding does not adhere to the press-contact surface of the horn and hence does not clog spaces between the elongated projections. Thus, vibration energy is transmitted efficiently to the conductive element during the next of the ultrasonic welding because the leading ends of the elongated projections are pressed in contact with the conductive element. Therefore, the conductive element can be welded ultrasonically to the member to be connected, while the outer surface of the conductive element is covered by the insulation coating layer and the conductive element and the member to be connected can be connected securely.

An exposing step of the method may further comprise partly stripping the insulation coating layer at a side opposite from the connecting surface of the flexible flat cable to expose the conductive element. With this method, the operation of ultrasonically welding the conductive element to the member to be connected can be repeated at the non-stripped portion of the insulation coating layer at the outer side of the flexible flat cable by causing the elongated projections of the horn to bite in the insulation coating layer of the flexible flat cable. A vibration energy then can be transmitted efficiently to the conductive element while the leading ends of the elongated projections are pressed in contact with the conductive element. However, the coating material molten by the vibration energy at the time of ultrasonic welding will not adhere to the press-contact surface of the horn to cause clogging between the elongated projections. Therefore, proper ultrasonic welding can be achieved while the outer surface of the conductive element is covered by the insulation coating layer and the conductive element and the member to be connected can be connected securely. Further, the conductive element can be connected Securely with the member to be connected by performing ultrasonic welding at the stripped portion of the insulation coating layer at the outer side of the flexible flat cable with the press-contact surface of the horn directly pressed in contact with the conductive element.

Slits preferably are formed in the elongated projections on the press-contact surface of the horn to make the elongated projections discontinuous along the longitudinal direction of the flexible flat cable.

The length of the stripped insulation coating layer at the side of the connecting surface preferably is slightly larger than an entire length of the horn.

The invention also relates to a horn of an ultrasonic welding machine for ultrasonically welding a flexible flat cable. The horn has a press-contact surface to be pressed into contact with the flexible flat cable. The press-contact surface has plurality of elongated projections having a tapered cross section. The elongated projections preferable are arranged to extend substantially in the longitudinal direction of the flexible flat cable.

With this construction, the ultrasonic welding can be repeated without having the molten coating material adhere to the press-contact surface of the horn in a manner that would clog spaces between the elongated projections. Therefore, the conductive element can be welded properly to the member to be connected while the outer surface of the conductive element is covered by the insulation coating layer.

Slits preferably are formed in the elongated projections on the press-contact surface of the horn to make the elongated projections discontinuous preferably substantially along the longitudinal direction of the flexible flat cable.

With this construction, recesses corresponding to the elongated projections are formed in a connecting portion of the conductive element of the flexible flat cable and the member to be connected, and discontinuous portions that make the recesses discontinuous are formed to correspond to the slits. Thus, a breakage created by a tensile load on the flexible flat cable is prevented from progressing along the recesses, and the conductive element of the flexible flat cable and the member to be connected can be held connected.

The discontinuous elongated projections preferably have an extension or length between about 0.3 mm and about 1 mm, more preferably between about 0.4 mm and 0.7 mm.

The press-contact surface of the horn may have an elongated projection area and a protrusion area. The elongate projection area has a plurality of elongated projections to be held substantially in contact with the non-stripped portion of the insulation coating layer. The protrusion area has a number of protrusion of tapered cross section to be held substantially in contact with a stripped-portion of the insulation coating layer.

With this construction, the stripped portion and the non-stripped portion of the insulation coating layer are provided on the outer side of the flexible flat cable. The ultrasonic welding of the conductive element to the member to be connected may have to be repeated. Thus, the elongated projections bite in the non-stripped portion and transmit vibration energy efficiently to the conductive element while the leading ends of the elongated projections press in contact with the conductive element. The coating material molten by the vibration energy will not adhere to the press-contact surface of the horn and will not clog spaces between the elongated projections. Further, the conductive element can be connected securely with the member to be connected by ultrasonic welding the stripped portion of the insulation coating layer with the press-contact surface of the horn directly pressed in contact with the conductive element.

A projecting distance of the protrusions preferably is longer than a projecting distance of the elongated projections by a distance corresponding to about the thickness of the insulation coating at the non-stripped portion.

The elongated projections preferably have a substantially acute-angled isosceles trapezoidal cross section.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
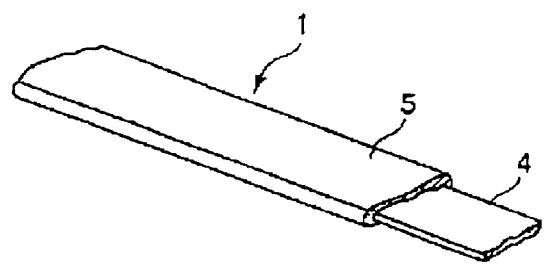
FIG. 1 is a perspective view of a flexible flat cable.
Figure 2:
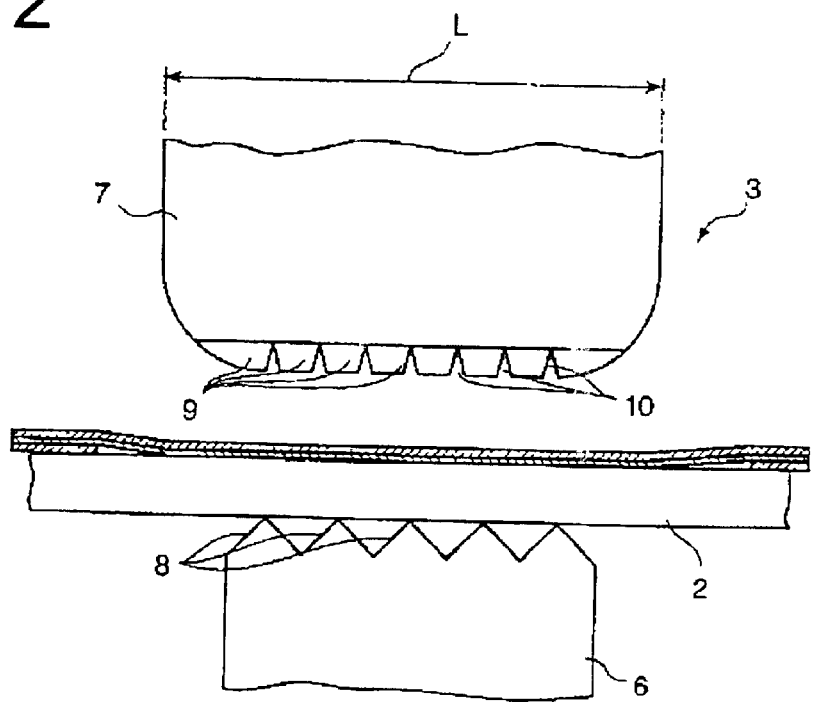
FIG. 2 is a diagram showing one embodiment of a horn of an ultrasonic welding machine according to the invention.
Figure 3:
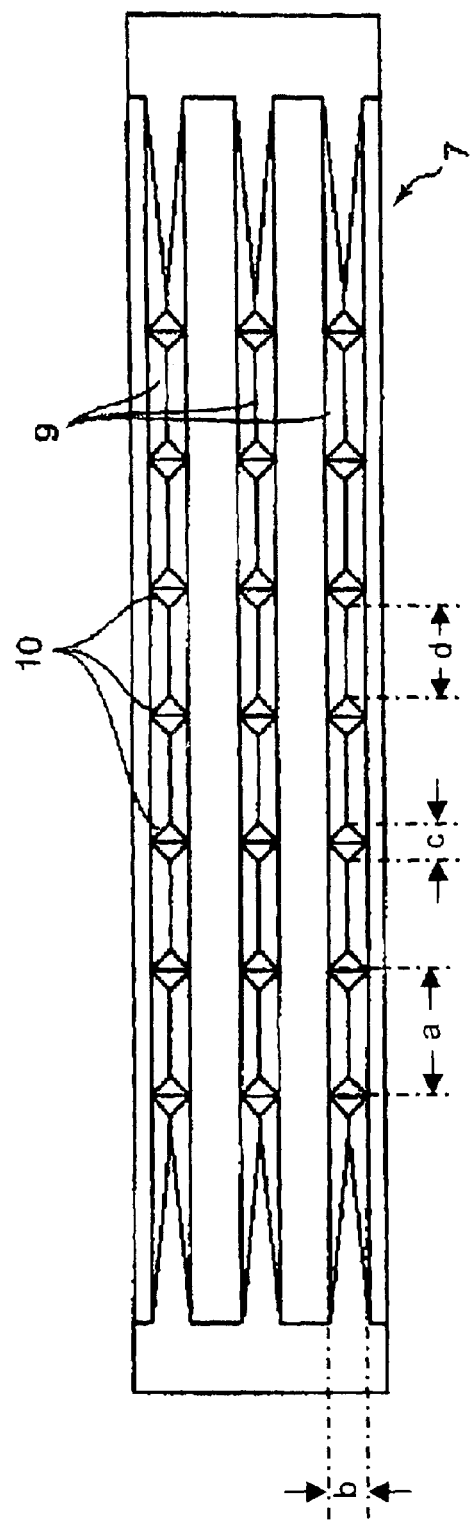
FIG. 3 is a bottom view of the horn.
Figure 4:
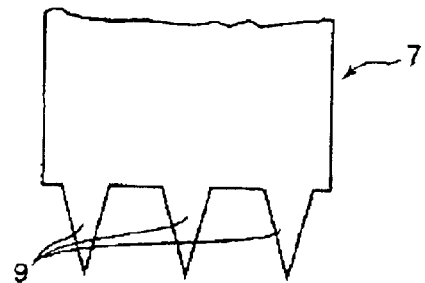
FIG. 4 is a side view of the horn.
Figure 5:
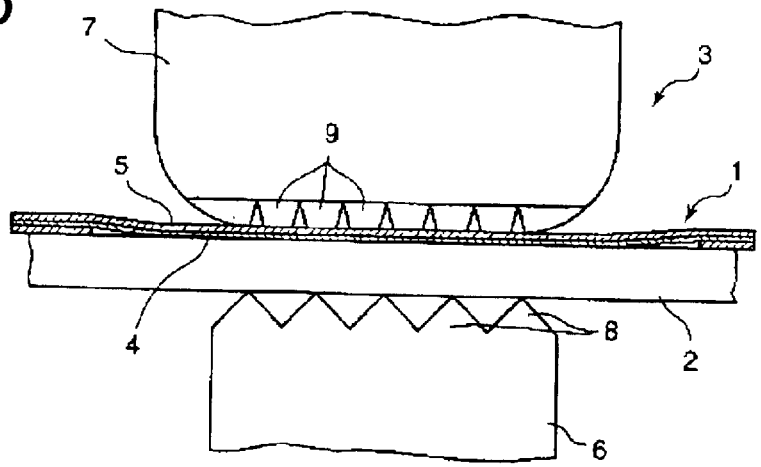
FIG. 5 is a diagram showing a press-contact surface of the horn is pressed in contact with an insulation coating layer of the flexible flat cable.

FIG. 1 shows a flexible flat cable 1 to be welded to a busbar 2 or other such member by an ultrasonic welding machine 3, as shown in FIGS. 2 through 4. The flexible flat cable 1, as shown in FIG. 1, has a conductive element 4 made of a copper foil with a thickness of about 35 μm. The conductive element 4 is covered by an insulation coating layer 5 made of, e.g. a PET (polyethylene terephthalate).

As shown in FIG. 2, the ultrasonic welding machine 3 has an anvil 6 on which the busbar 2 is placed, and a horn 7 for pressing the conductive element 4 of the flexible flat cable 1 into contact with the busbar 2. Tapered protrusions 8 having a substantially right-angled isosceles triangular cross section are formed on the upper surface of the anvil 6 facing the busbar 2 and/or the flexible flat cable 1 and the busbar 2 can be placed on these protrusions 8.

Three elongated projections 9 are arranged at an angle between about −45° to about 45°, and preferably between about −20° to about 20° with respect to the longitudinal direction of the flexible flat cable 1. The projections 9 extend substantially in the longitudinal direction of the flexible flat cable 1 and have substantially acute-angled isosceles triangular cross sections. The elongated projections 9 are provided on a press-contact surface of the horn 7 that is to be pressed into contact with the upper surface of the flexible flat cable 1, as shown in FIGS. 3 and 4. The tips of the elongated projections 9 are truncated to define a surface that is substantially parallel to the surface of the insulation coating layer 5 or to the flat flexible cable 1. Thus, the elongated projections 9 have a trapezoidal cross-sectional shape. Preferably a distance of less than about 5% is truncated at the distal end of the elongated projections. The tip of the elongated projections 9 may be slightly rounded, provided that they can cut into the insulation coating layer 5 during the welding process, as described herein. A number of substantially V-shaped slits 10 widened toward the leading end of the elongated projection 9 are formed at a specified interval in each of these elongated projections 9. Thus, the slits 10 make the respective elongated projections 9 discontinuous at a plurality of positions. The slits 10 interrupt-the elongated projections 9 and thereby enhance the gripping power of the horn 7.

The flexible flat cable 1 can be connected with the busbar 2 or other such member using the ultrasonic welding machine 3. More particularly, the connecting process includes stripping a portion of the insulation coating layer 5 on a connecting surface of the flexible flat cable 1 over a specified range to expose the conductive element 4, as shown in FIG. 2. The exposed section of the conductive element 4 is slightly longer than the horn 7. The insulation coating 5 is stripped off only on a contact surface of the conductive element 4 to be connected with the busbar 2, while the insulation coating 5 on a surface substantially opposite the contact surface remains on the conductive element 4.

The method proceeds by introducing the flexible flat cable 1 and the busbar 2 between the horn 7 and the anvil 6 of the ultrasonic welding machine 3. Thus, the conductive element 4 is positioned on the connecting surface of the flexible flat cable 1 and is held in contact with the upper surface of the busbar 2. The horn 7 then is lowered to bring the press-contact surface of the horn 7 into contact with the insulation coating layer 5 of the flexible flat cable 1.

Figure 6:
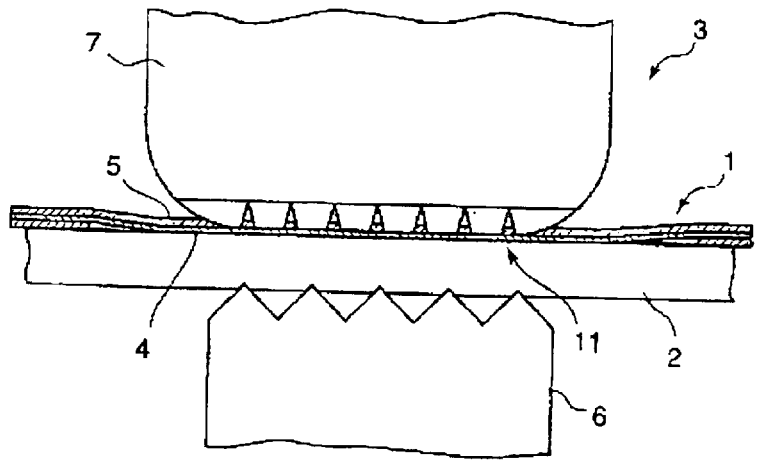
FIG. 6 is a diagram showing elongated projections of the horn bite in the insulation coating layer of the flexible flat cable.

The method then continues by transmitting an ultrasonic vibration or wave to the horn 7 from an unillustrated oscillator. Additionally, the elongated projections 9 on the press-contact surface of the horn 7 are caused to bite or cut slightly into the insulation coating layer 5, as shown in FIG. 6. Thus, the ultrasonic vibration is transmitted to the conductive element 4 with the leading end surfaces of the elongated projections 9 pressed substantially in contact with the upper surface of the conductive element 4. As a result, a connecting portion is formed where the conductive element 4 of the flexible flat cable 1 is welded ultrasonically to the busbar 2.

The ultrasonic energy from the horn 7 causes the insulation coating layer 5 to become molten, and hence the elongated projections 9 can bite in and enter the insulation coating layer 5. Thus, the leading end surfaces of the elongated projections 9 are pressed substantially into contact with the conductive element 4 and the conductive element 4 is welded ultrasonically to the busbar 2. Thus, the conductive element 4 is connected strongly to the busbar 2 without causing any problem such as a lack of connection strength between the conductive element 4 and the busbar 2 due to absorption of the ultrasonic vibration by the insulation coating layer 5.

The conductive element 4 is connected to the busbar 2 with the outer surface of the conductive element 4 covered by the insulation coating layer 5. Thus, the breaking strength of the connecting portion 11 against an external load on the flexible flat cable 1 is improved due to the reinforcing action of the insulation coating layer 5.

The above-described welding operation typically is repeated from one flexible flat cable 1 to another. However, the coating material molten by the vibration energy at the time of ultrasonic welding will not adhere to the press-contact surface of the horn 7. Accordingly, clogging between the elongated projections 9 from one ultrasonic welding operation to the next can be suppressed.

Figure 11:
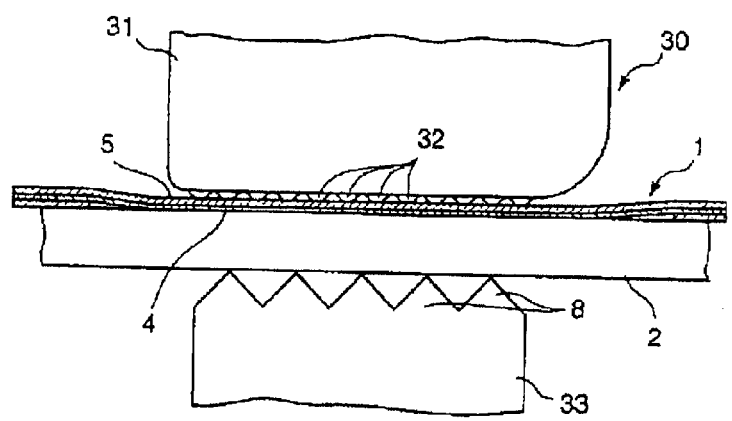
FIG. 11 is a diagram showing a prior art horn construction of an ultrasonic welding machine.
Figure 12:
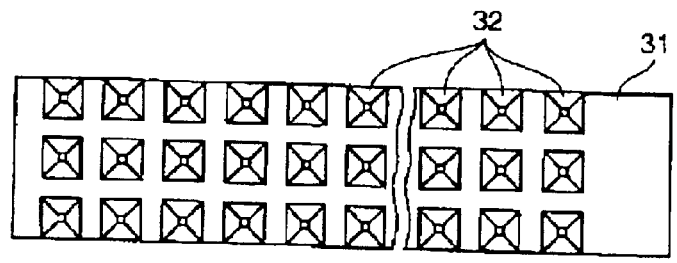
FIG. 12 is a bottom view showing the prior art horn.

Specifically, the prior art ultrasonic welding apparatus shown in FIG. 11 has only truncated pyramidal protrusions 32 on the press-contact surface of the horn 7. Molten coating material is likely to clog the narrow clearances between the respective protrusions 32 while pressing the horn 7 into contact with the insulation coating layer 5 of the flexible flat cable 1 during the prior art ultrasonic welding process. If the above ultrasonic welding operation is repeated, a connection failure resulting from an incapability of causing the protrusions 32 to bite in the insulation coating layer 5 is unavoidable. Contrary to this, the elongated projections 9 have a tapered cross section and extend in the longitudinal direction of the flexible flat cable 1 on the press-contact surface of the horn 7. Thus, the vibration energy can be transmitted to the conductive element 4 while the leading ends of the elongated projections 9 are pressed securely substantially in contact with the conductive element 4 without the molten coating material being adhered to the press-contact surface of the horn 7 to clog the narrow clearances. Thus, the conductive element 4 can be properly ultrasonically welded to the busbar 2.

The elongated projections 9 on, the press-contact surface of the horn 7 are made discontinuous by slits 10 at specified intervals along the longitudinal direction of the flexible flat cable 1. The slits 10 prevent the connecting portion of the conductive element 4 and the busbar 2 from being broken by ensuring a sufficient breaking strength of the conductive element 4 against an external load to act on the flexible flat cable 1.

Figure 7A:
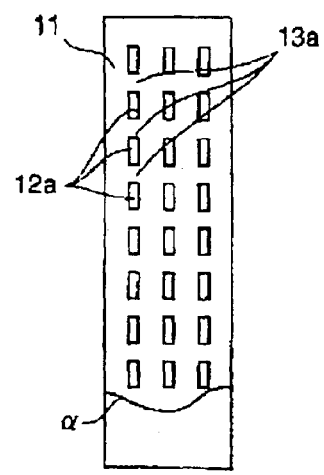
FIG. 7(a) is a diagram showing a connecting portion of the flexible flat cable and a member to be connected.
Figure 7B:
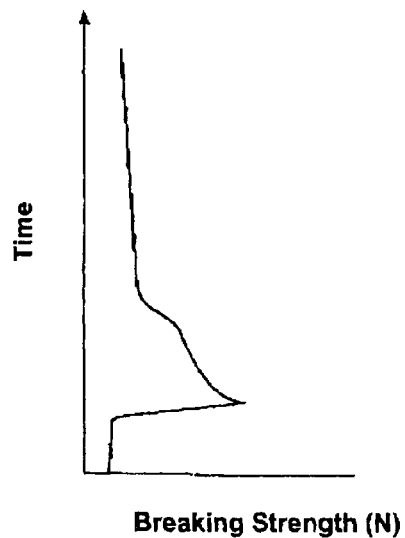
FIG. 7(b) is a graph showing a relationship between a breaking direction and a breaking strength at the connecting portion.

For example, the elongated projections 9 on the entire press-contact surface of the horn 7 are set to have a length L of 5.3 mm and the slits 10 are formed at an interval of about 0.5 mm. A number of discontinuous portions 13a making recesses 12 formed in the connecting portion of the conductive element 4 of the flexible flat cable 1 and the busbar 2 discontinuous are formed at an interval of about 0.5 mm, as shown in FIG. 7. Thus, a breakage α caused by an external load on the flexible flat cable 1 can be prevented from progressing along the recesses 12a. Hence, a breaking strength (N) of the connecting portion 11 against the external load shows a large peak at an initial stage of the breakage caused by the external-load acting on the connecting portion 11 the conductive element 4 of the flexible flat cable 1 and the busbar 2 as shown in FIG. 7(b). Therefore, the conductive element 4 of the flexible flat cable 1 and the busbar 2 can be held stably connected.

The elongated projections 9 have a length "a" at the base thereof of about 0.5 mm and a width "b" at the base of about 0.14 mm. More particularly, the ratio b/a of the length "b" to the width "a" preferably is in the range of about 2 to about 5, and more preferably from about 2.5 to about 4. The length "c" of the slits 10 is between about 0.1 mm and about 0.2 mm. More particularly, the ratio c/a of the length "c" of the slits to the length "a" of the elongate projections 9 is between about 0.1 and about 2. The length "d" of the tip or distal portion of the elongated projection is between about 0.3 and about 0.4. More particularly, the ratio d/a of the length "d" of the tip portion to the length "a" at the base portion of the elongated projection 9 is between about 0.5 and about 0.9.

Figure 8A:
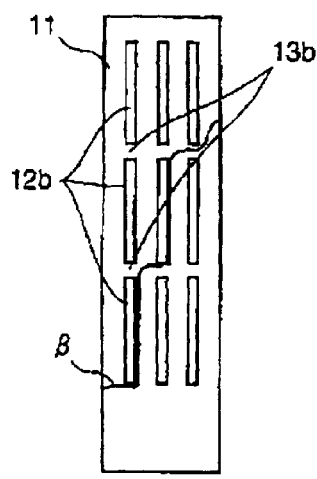
FIG. 8(a) is a diagram showing a connecting portion of the flexible flat cable and the member to be connected.
Figure 8B:
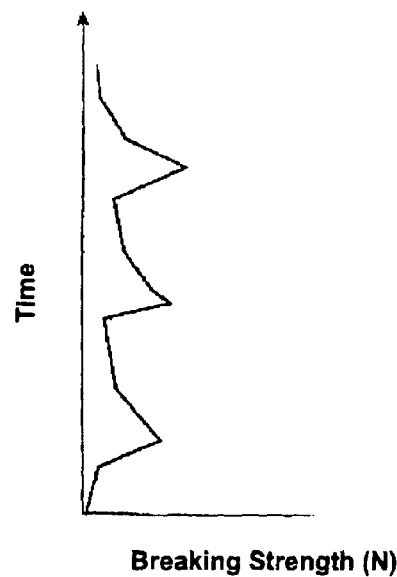
FIG. 8(b) is a graph showing a relationship between the breaking direction and the breaking strength at the connecting portion.

On the other hand, the V-shaped slits 10 on the press-contact surface of the horn 7 could be discontinuous at an interval of about 1.3 mm to make each recess 12b formed in the connecting portion 11 discontinuous at two discontinuous portions 13b as shown in FIG. 8(a). In this situation, a breakage β caused by an external load acting on the flexible flat cable 1 is likely to progress along the recesses 12b and a breaking strength (N) of the connecting portion 11 against the tensile load tends to decrease as shown in FIG. 8(b) as the breakage β progresses. Thus, even upon the action of a relatively small tensile load, the breakage β is likely to progress over the entire length of the connecting portion 11. Therefore, it is difficult to hold the conductive element 4 of the flexible flat cable 1 and the busbar 2 stably connected.

The elongated projections 9 could be provided over the entire length of the horn 7 without the slits 10. In this situation, a breakage created at one end of the connecting portion 11 by a tensile load on the flexible flat cable 1 will unavoidably progress over the entire length of the connecting portion 11 at once. Accordingly, it is desirable to make the elongated projections 9 discontinuous at specified intervals along the longitudinal direction of the flexible flat cable 1 by forming slits 10 in the elongated projections 9.

Figure 9:
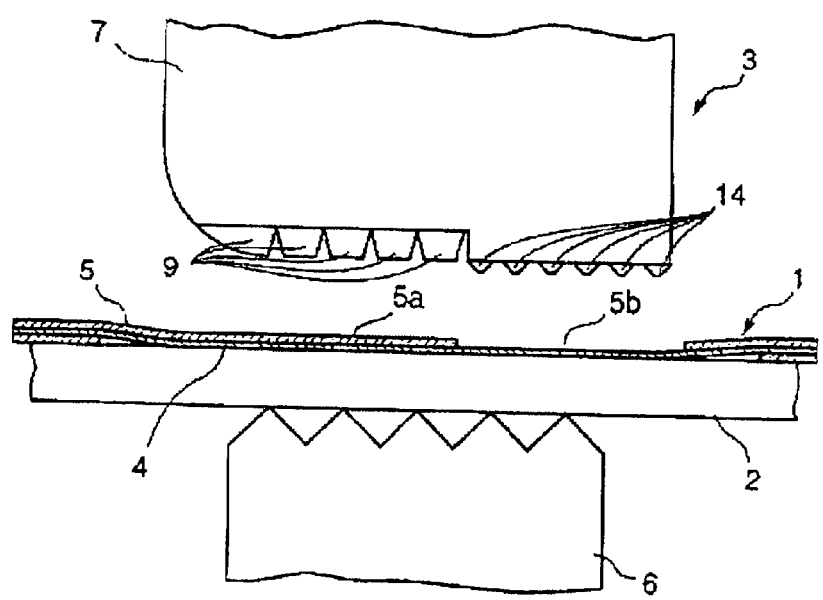
FIG. 9 is a diagram showing another horn according to the invention.

In the first embodiment, the flexible flat cable 1 and the busbar 2 are connected without stripping the insulation coating layer 5 at the side opposite from the connecting surface of the flexible flat cable 1 with the busbar 2. However, as shown in FIG. 9, the insulation coating layer 5 at the opposite side of the connecting surface may be stripped partly to expose the conductive element 4 in a stripped portion 5b while leaving a non-stripped portion 5a in addition to the insulation coating layer 5 at the side of the connecting surface of the flexible flat cable 1. The flexible flat cable 1 and the busbar 2 may be introduced between the anvil 6 and the horn 7 of the ultrasonic welding machine 3 to weld the conductive element 4 to the busbar 2 ultrasonically with the conductive element 4.

With the above arrangement, ultrasonic welding can be performed with the press-contact surface of the horn 7 pressed directly in contact with the conductive element 4 in the stripped portion 5b of the insulation coating layer 5 at the outer side of the flexible flat cable 1, thereby transmitting the ultrasonic vibration energy to the conductive element 4 more efficiently. Thus, metallic atoms of the conductive element 4 and the busbar 2 are brought into contact and connected securely. Breaking strength also can be enhanced by the reinforcing action of the non-stripped portion 5a of the insulation coating layer 5 left at the outer side of the flexible flat cable 1.

Figure 10:
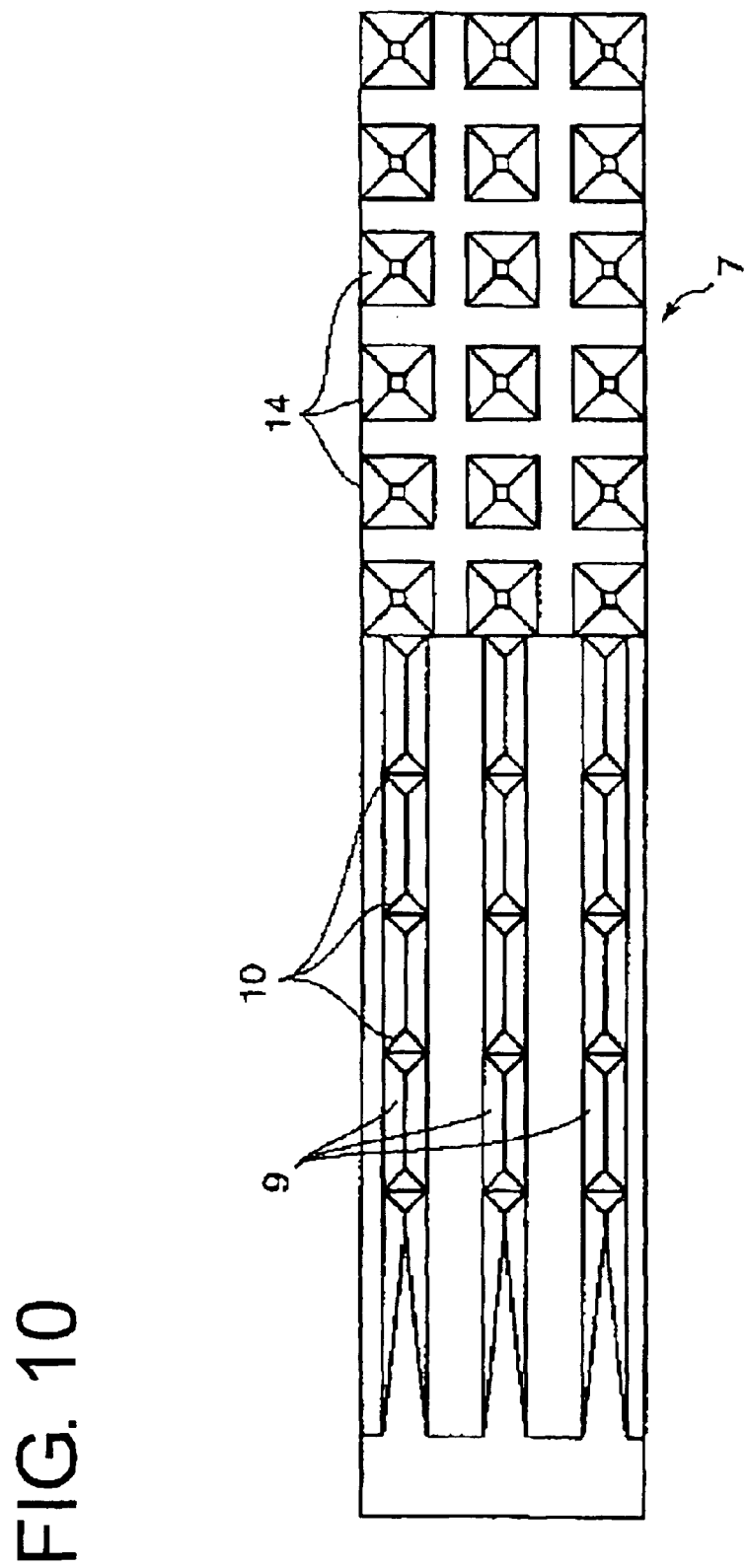
FIG. 10 is a bottom view showing the horn of FIG. 9.

Further, as shown in FIGS. 9 and 10, the ultrasonic welding machine 3 has an elongated projection area where elongated projections 9 extend substantially in the longitudinal direction of the flexible flat cable 1. Additionally, the ultrasonic welding machine 3 has a protrusion area where protrusions 14 in the form of tapered truncated pyramids are defined on the press-contact surface of the horn 7. Ultrasonic welding may be applied by holding the elongated projections 9 in contact with a non-stripped portion 5a of the insulation coating layer 5 at the outer side of the flexible flat cable 1, while holding the protrusions 14 in contact with the conductive element 4 at a stripped portion 5b of the insulation coating layer 5. A projecting distance of the protrusions 14 exceeds a projecting distance of the elongated projections 9 by about the thickness of the insulation coating 5.

With the above construction, the ultrasonic welding operation can be repeated at non-stripped portions 5a of the insulation coating layers 5. More particularly, the conductive element 4 can be joined properly with the busbar 2 so that the connecting portion 11 of the flexible flat cable 1 and the busbar 2 are reinforced by the insulation coating layer 5. Additionally, the coating material molten by the vibration energy at the time of ultrasonic welding to the press-contact surface will not adhere to or clog the horn 7. Further, the conductive element 4 can be welded securely to the busbar 2 by directly pressing the protrusions 14 into contact with the conductive element 4 at the stripped portion 5b of the insulation coating layer 5. Therefore, there is an advantage of effectively improving the connection strength of the conductive element 4 with the busbar 2.

In the foregoing embodiments, the conductive element 4 of the flexible flat cable 1 is connected with the busbar 2. However, the member to be connected is not limited to the busbar 2. The present invention is applicable to methods for connecting the conductive element 4 with various known members to be connected by the horn of the ultrasonic welding machine 3. For example, a pair of conductive elements 4 may be exposed by stripping the insulation coating layers 5 at the connecting surfaces of a pair of flexible flat cables 1 and ultrasonically welded to each other by the ultrasonic welding machine 3.

Moreover the invention is applicable to a great variety of flat cables such as flat cables comprising a plurality of conductors or wires arranged substantially side by side, shielded flat cables, non-shielded flat cables, flat cables having conductors with different cross-sections such as thicker and thinner wires etc.

What is claimed is:

1. A method for welding a flexible flat cable to a member, the flat flexible cable having a conductive element covered on opposite first and second sides by an insulation coating, comprising:

stripping part of the insulation coatings from the first side of the flexible flat cable for exposing a section of the conductive element;

introducing the flexible flat cables and the members between a horn and an anvil of an ultrasonic welding machine so that the exposed section of the conductive element is held substantially in contact with the member, the horn having a press-contact surface with a plurality of elongated projection;

pressing the elongated projections into contact with the insulation coating on the second side of the flexible flat cable; and transmitting an ultrasonic vibration to the horns for causing the elongated projections to bite into the insulation coating layer and substantially into contact with the conductive element for ultrasonically welding the conductive element to the member.

2. The method of claim 1, further comprising aligning the flat flexible cable substantially parallel to the elongated projections.

3. The method of claim 1, further comprising stripping part of the insulation coating from the second side of the flexible flat cable to define a non-stripped portion and a stripped portion on the second side of the flexible flat cable, and pressing the horn into contact with both the non-stripped portion and the stripped portion to weld the conductive element ultrasonically to the members.

4. The method of claim 1, wherein slits are formed in the respective elongated projections on the press-contact surface of the horn to make the elongated projections discontinuous substantially along a longitudinal direction of the flexible flat cable.

5. The method of claim 1, wherein the insulation coating is stripped from the first side of the flexible flat cable for a distance slightly longer than a lengthy of the horn.

6. A horn of an ultrasonic welding machine for ultrasonically welding a flexible flat cable, the horn having a press-contact surface with a plurality of substantially parallel elongated projections of tapered cross section for pressed contact with the flexible flat cable, each said elongated projection being formed with slits to make the respective elongated projection discontinuous.

7. The horn of claims 6, wherein the discontinuous elongated projections shave an extension between about 0.3 mm and about 1 mm.

8. The horn of claim 8, wherein the discontinuous elongated projections have an extension of between about 0.4 mm and 0.7 mm.

9. A horn of an ultrasonic welding machine for ultrasonically welding a flexible flat cable, the horn having a press-contact surface with a plurality of substantial parallel elongated projections of tapered cross section for pressed contact with the flexible flat cable, wherein the press-contact surface of the horn comprises an elongated projection area where the plurality of elongated projections are provided and a protrusion area where a number of protrusion having a tapered cross are provided.

10. The horn of claim 9, wherein a projecting distance of the protrusions is longer than a projecting distance of the elongated projections by a distance corresponding to about a thickness of insulation coating on a flexible flat cable.

11. The horn of claim 6, wherein the elongated projection have a substantially acute-angled isosceles triangular cross section.

* * * * *